United States Patent [19]

Rios et al.

[11] Patent Number: 5,490,568

[45] Date of Patent: Feb. 13, 1996

[54] TRACTOR-MOUNTED STAKE DRIVER

[76] Inventors: Jose J. Rios; Mack D. Worland, both of 4890 E. Acampo Rd., Acampo, Calif. 95220

[21] Appl. No.: 143,831

[22] Filed: Oct. 27, 1993

[51] Int. Cl.$^6$ ............................... E21B 7/02; E21C 11/02
[52] U.S. Cl. ............... 173/42; 173/184; 173/28; 175/19; 405/232; 405/303
[58] Field of Search ................................. 405/231, 232; 175/19; 173/190, 193, 184, 42, 28, 27, 22

[56] References Cited

U.S. PATENT DOCUMENTS

| 1,678,643 | 7/1928 | Kassebeer | 111/109 |
|---|---|---|---|
| 2,261,017 | 10/1941 | Chandler | 173/27 X |
| 3,327,789 | 6/1967 | Furuseth | 173/42 X |
| 3,507,338 | 4/1970 | McWaters et al. | 173/28 |
| 4,193,459 | 3/1980 | Engstrom | 173/193 |
| 4,373,833 | 2/1983 | Watanabe | 111/109 X |
| 4,473,256 | 9/1984 | Collins | 173/28 X |
| 4,915,180 | 4/1990 | Schisler | 173/193 X |
| 5,232,268 | 8/1993 | Dengler et al. | 173/184 X |

FOREIGN PATENT DOCUMENTS 1571240  6/1990  U.S.S.R. ................................. 173/42

Primary Examiner—Dennis L. Taylor
Attorney, Agent, or Firm—Larry D. Johnson

[57] ABSTRACT

A tractor mounted stake driver provides a mechanical/hydraulic system to drive a plurality of stakes into the ground simultaneously, with provision for stake separation adjustment. The apparatus includes a tractor and a front stake driving assembly including a right and left front stake driving ram joined by a separation adjustment device. The apparatus may further include a rear stake driving assembly to enable four stakes to be driven simultaneously. Either the front or rear assembly may additionally include a fore/aft adjustment mechanism to enable selective spacing between the front-driven stakes and rear-driven stakes.

2 Claims, 4 Drawing Sheets

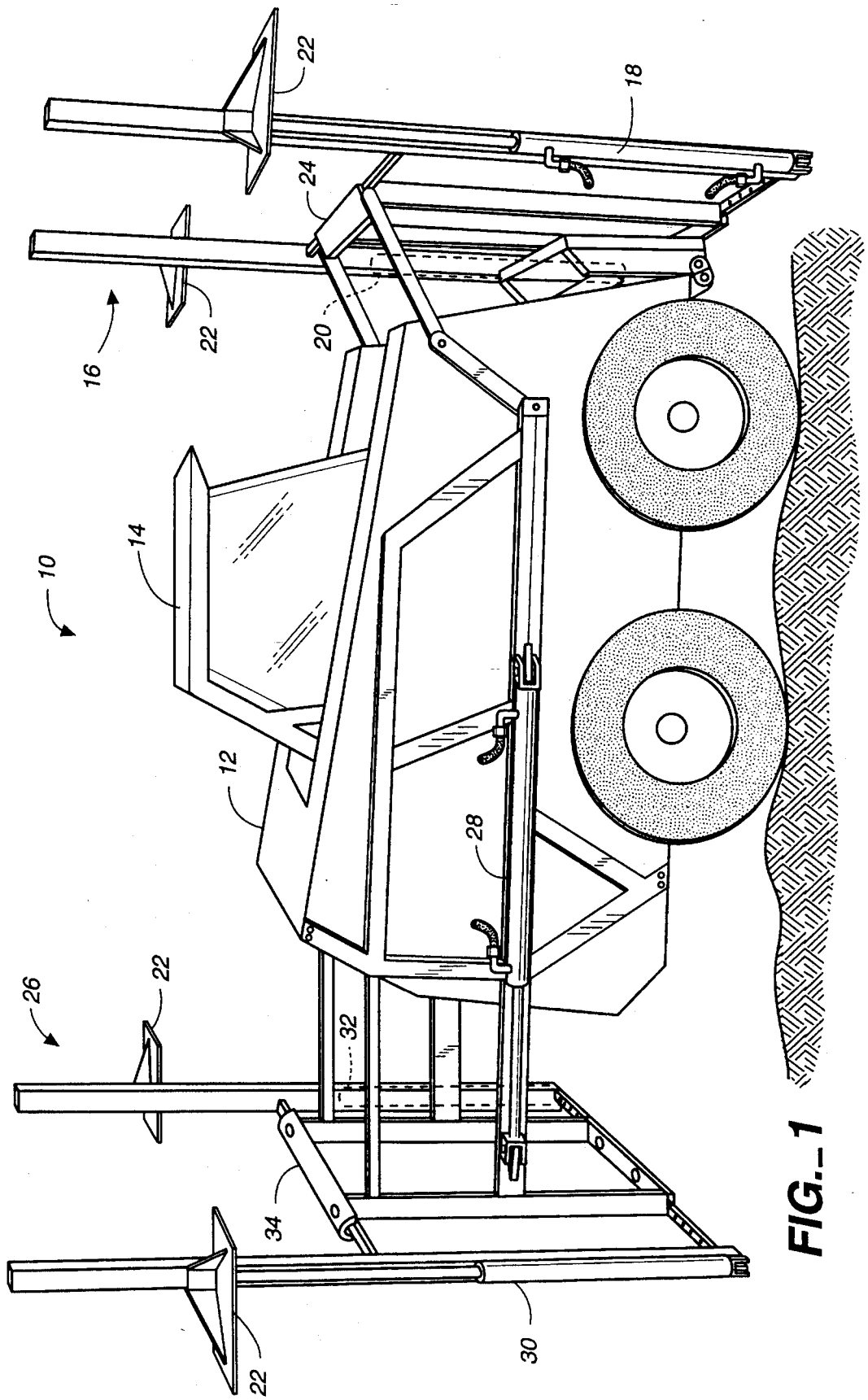
FIG._1

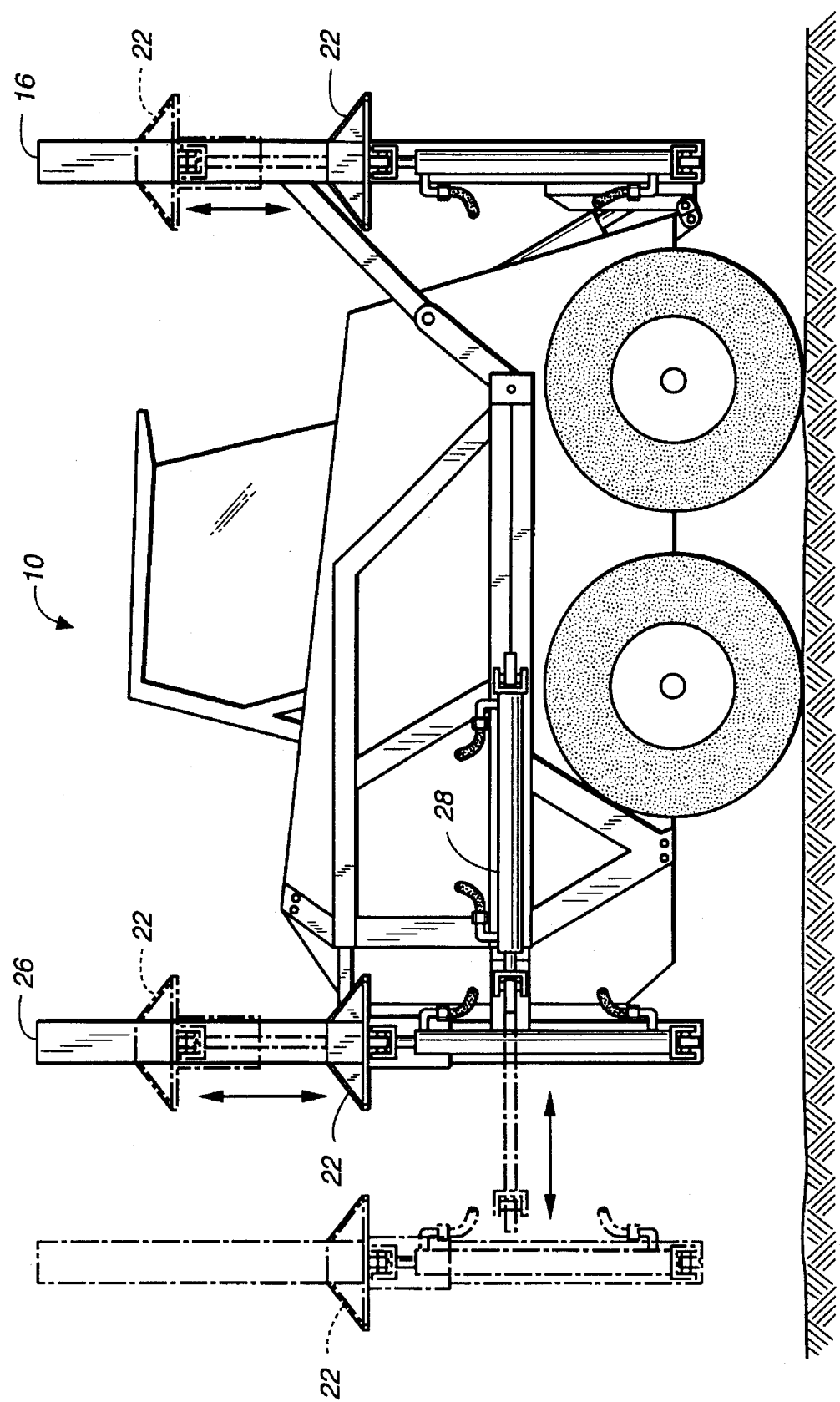
FIG._2

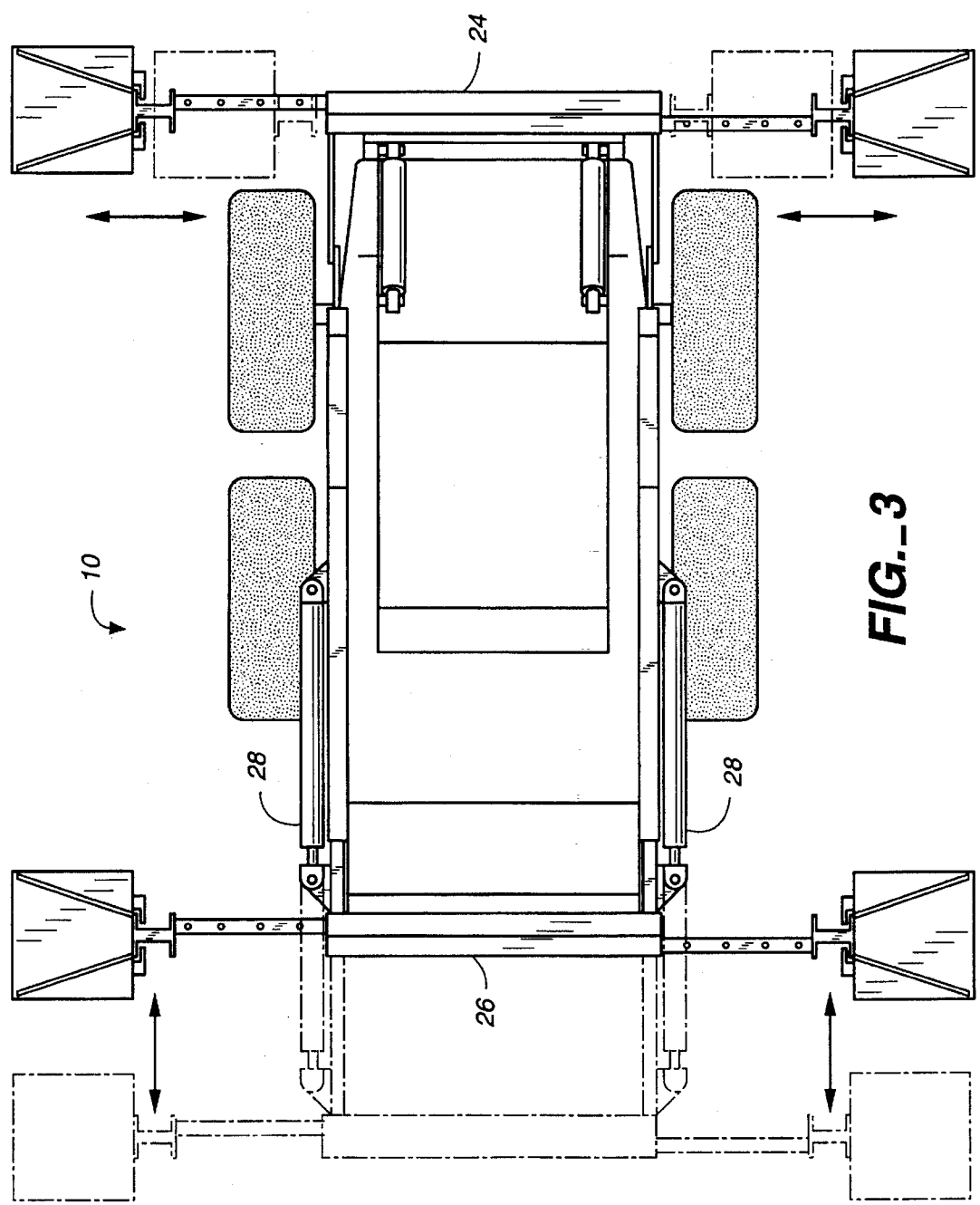

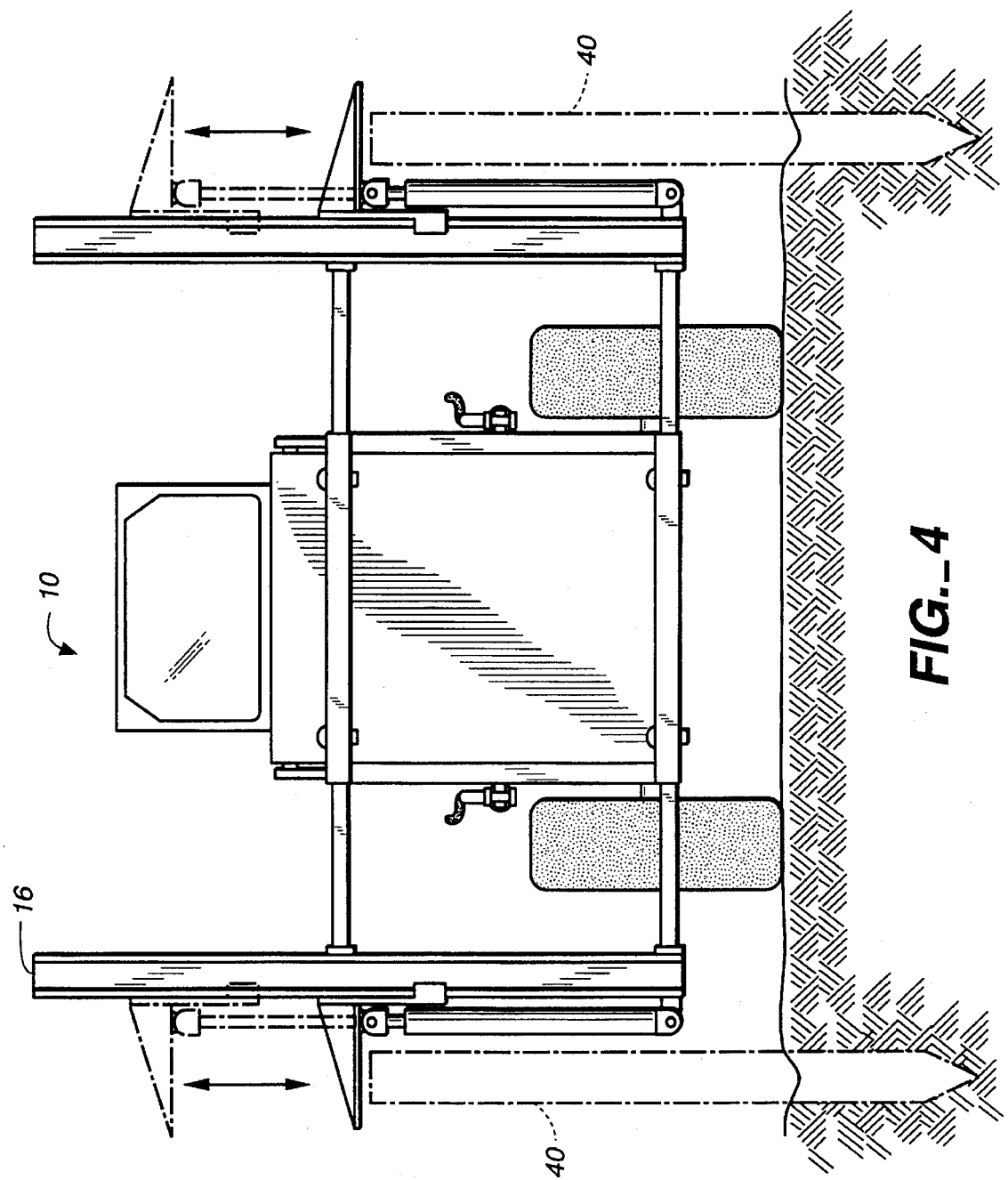
FIG._4

TRACTOR-MOUNTED STAKE DRIVER

BACKGROUND OF THE INVENTION

1. Field of the Invention

This invention relates generally to farm and agricultural equipment, and more specifically to an improved tractor-mounted stake driver.

2. Description of the Prior Art

Numerous agricultural plants are supported on stakes, with large plantings requiring an extensive array of stakes. Traditionally, these stakes were manually driven into the ground, one at a time. Recently, various mechanical stake driving devices have been developed, but known systems still drive stakes one at a time.

SUMMARY OF THE INVENTION

The tractor mounted stake driver of this invention provides a mechanical/hydraulic system to drive a plurality of stakes into the ground simultaneously, with provision for stake separation adjustment. The inventive apparatus includes a tractor; a front stake driving assembly mounted to the tractor and including a right front stake driving ram and a left front stake driving ram, each bearing a stake driving plate, joined by a front stake separation adjustment means; and a rear stake driving assembly mounted to the tractor and including a right rear stake driving ram and a left rear stake driving ram, each also bearing a stake driving plate, joined by a rear stake separation adjustment means. Either the front or rear assembly may additionally include a fore/aft adjustment mechanism to enable selective spacing between the front-driven stakes and rear-driven stakes.

The tractor mounted stake driver of this invention is preferably mounted on a Bobcat model 943 tractor or equivalent tractor to provide desired maneuverability and quickness of application. This equipment's skidsteer and hydrostatics make it very compatible for the rapid forward and backward movements needed to complete the stake-driving phase of the operation most efficiently.

Benefits of this design include:

The system utilizes a hydraulic quad stake pusher (pushes up to four stakes at one time).

The distance between stakes from front to back may be adjusted hydraulically from 10' to 13'.

The width between stake rows (stake separation) can be adjusted from 6' to 12'.

There is the option of four stakes driven simultaneously, or two stakes only by using a set of isolator valves to shut off the rear two stake-driving cylinders.

The system is capable of pushing stakes in sizes from 3' to 10' in length.

The rear extensions are hydraulically controlled.

There are stake storage capabilities on each side of the tractor.

The tractor includes mirrors and lights (front and rear) for 24 hour operation.

Electronically controlled auxiliary hydraulics switching is located in the tractor cab for ease of operating the stake-driver system.

The system includes adjustable turnbuckle stabilizers for adjustment of height and angle.

BRIEF DESCRIPTION OF THE DRAWINGS

FIG. 1 is a right side perspective view of a tractor mounted stake driver of this invention, illustrating a tractor and cab; a front stake driving assembly mounted to the tractor and including a right front stake driving ram and a left front stake driving ram, each bearing a stake driving plate, joined by a front stake separation adjustment means; and a rear stake driving assembly mounted to the tractor by a fore/aft adjustment means and including a right rear stake driving ram and a left rear stake driving ram, each bearing a stake driving plate, joined by a rear stake separation adjustment means;

FIG. 2 is a right side elevational view of the tractor mounted stake driver of this invention illustrating the up and down motion of the ram-driven stake driving plates, and the fore/aft adjustment of the rear assembly by the fore/aft adjustment means;

FIG. 3 is a top plan view of the tractor mounted stake driver of this invention, illustrating the front stake separation adjustment by the front stake separation adjustment means, and the fore/aft adjustment of the rear assembly by the fore/aft adjustment means; and FIG. 4 is a front end elevational view of the tractor mounted stake driver of this invention illustrating a pair of stakes (illustrated in phantom) being simultaneously driven into the ground by the front stake driving assembly.

DETAILED DESCRIPTION OF A PREFERRED EMBODIMENT

FIG. 1 is a right side perspective view of a tractor mounted stake driver 10 of this invention, illustrating a tractor 12 and cab 14; a front stake driving assembly 16 mounted to the tractor and including a right front stake driving ram 18 and a left front stake driving ram 20, each bearing a stake driving plate 22, joined by a front stake separation adjustment means 24; and a rear stake driving assembly 26 mounted to the tractor by a fore/aft adjustment means 28 and including a right rear stake driving ram 30 and a left rear stake driving ram 32, each bearing a stake driving plate 22, joined by a rear stake separation adjustment means 34. Fore/aft adjustment means 28 may comprise a hydraulic ram (as illustrated), or other remotely controlled system, or simply provide a manual or mechanical length adjustment such as a telescoping rod. Similarly, the front and rear stake separation adjustment means 24, 34 may comprise a remotely controlled system, or provide simple manual width adjustment (as illustrated).

FIG. 2 is a right side elevational view of the tractor mounted stake driver 10 of this invention illustrating the up and down motion of the ram-driven stake driving plates 22, and the fore/aft adjustment of the rear assembly 26 by the fore/aft adjustment means 28.

FIG. 3 is a top plan view of the tractor mounted stake driver 10 this invention, illustrating the front stake separation adjustment by the front stake separation adjustment means 24, and the fore/aft adjustment of the rear assembly 26 by the fore/aft adjustment means 28.

FIG. 4 is a front end elevational view of the tractor mounted stake driver 10 of this invention illustrating a pair of stakes 40 (illustrated in phantom) being simultaneously driven into the ground by the front stake driving assembly 16.

While this invention has been described in connection with preferred embodiments thereof, it is obvious that modifications and changes therein may be made by those skilled in the art to which it pertains without departing from the spirit and scope of the invention. Accordingly, the scope of this invention is to be limited only by the appended claims.

What is claimed as invention is:

1. A tractor mounted stake driver for simultaneously driving a plurality of stakes into the ground, said tractor mounted stake driver comprising:

a tractor;

a front stake driving assembly mounted to said tractor and including a right front stake driving ram and a left front stake driving ram, each bearing a stake driving plate, joined by a front stake separation adjustment means; and a rear stake driving assembly mounted to said tractor and including a right rear stake driving ram and a left rear stake driving ram, each bearing a stake driving plate, joined by a rear stake separation adjustment means.

2. The tractor mounted stake driver of claim 1 wherein said rear stake driving assembly includes a fore/aft adjustment means.

* * * * *